(12) United States Patent
Ishigami et al.

(10) Patent No.: US 11,453,079 B2
(45) Date of Patent: Sep. 27, 2022

(54) MULTI-ELECTRODE SUBMERGED ARC WELDING METHOD

(71) Applicant: JFE Steel Corporation, Tokyo (JP)

(72) Inventors: Atsushi Ishigami, Tokyo (JP); Naoya Hayakawa, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 293 days.

(21) Appl. No.: 15/999,362

(22) PCT Filed: Feb. 7, 2017

(86) PCT No.: PCT/JP2017/004312
§ 371 (c)(1),
(2) Date: Aug. 17, 2018

(87) PCT Pub. No.: WO2017/141760
PCT Pub. Date: Aug. 24, 2017

(65) Prior Publication Data
US 2019/0105726 A1   Apr. 11, 2019

(30) Foreign Application Priority Data

Feb. 19, 2016   (JP) .................................. 2016-029654
Aug. 15, 2016   (JP) .............................. JP2016-159300

(51) Int. Cl.
*B23K 9/18*   (2006.01)
*B23K 9/02*   (2006.01)
(Continued)

(52) U.S. Cl.
CPC .................. *B23K 9/18* (2013.01); *B23K 9/02* (2013.01); *B23K 9/188* (2013.01);
(Continued)

(58) Field of Classification Search
CPC ............ B23K 2101/18; B23K 2101/06; B23K 9/188; B23K 9/18; B23K 9/186
See application file for complete search history.

(56) References Cited

U.S. PATENT DOCUMENTS 5,140,140 A * 8/1992 Pollack .................. B23K 9/188
219/61
2014/0346149 A1* 11/2014 Ishigami .............. B23K 33/006
219/73

FOREIGN PATENT DOCUMENTS

CN   201537764 U   8/2010
JP   4-147770 A    5/1992
(Continued)

OTHER PUBLICATIONS

First Office Action dated Jan. 20, 2020, of counterpart Chinese Application No. 201780011758.7, along with a Search Report in English.

(Continued)

*Primary Examiner* — Ibrahime A Abraham
*Assistant Examiner* — Dilnessa B Belay
(74) *Attorney, Agent, or Firm* — DLA Piper LLP (US)

(57) ABSTRACT

A multi-electrode submerged arc welding method enables, in multi-electrode submerged arc welding using five or six electrodes, a deep penetration and a large amount of deposit metal to be obtained by supplying a large current, and enables stable arc to be generated by respective electrodes by suppressing magnetic interference. Welding defects can be prevented, beads with a good shape or appearance can be obtained, and the welding speed can be increased.

4 Claims, 2 Drawing Sheets

(51) Int. Cl.
  *B23K 101/18* (2006.01)
  *B23K 103/04* (2006.01)
  *B23K 101/06* (2006.01)

(52) U.S. Cl.
  CPC ...... *B23K 2101/06* (2018.08); *B23K 2101/18* (2018.08); *B23K 2103/04* (2018.08)

(56) References Cited

FOREIGN PATENT DOCUMENTS

| | | | |
|---|---|---|---|
| JP | 04147770 A | * | 5/1992 |
| JP | 5-50235 A | | 3/1993 |
| JP | H08-257752 A | | 10/1996 |
| JP | 10-43859 A | | 2/1998 |
| JP | H04147770 A | * | 9/2008 |
| JP | 4828488 B2 | | 11/2011 |
| JP | 2013-111622 A | | 6/2013 |
| JP | 2013-237103 A | | 11/2013 |
| JP | 2014-73523 | | 4/2014 |
| JP | 2014-73523 A | | 4/2014 |
| JP | 2015186823 A | * | 10/2015 ............... B23K 9/18 |

OTHER PUBLICATIONS

Extended European Search Report dated Feb. 11, 2019, of counterpart European Application No. 17753018.5.
The Second Office Action dated Sep. 23, 2020, of counterpart Chinese Application No. 201780011758.7, along with a Concise Statement of Office Action in Enghsh.
Third Office Action dated Mar. 24, 2021, of counterpart Chinese Application No. 201780011758.7, along with a Concise Statement of Relevance of Office Action in English.
European Office Action dated Jan. 19, 2022, of counterpart European Application No. 17753018.5.

* cited by examiner

MULTI-ELECTRODE SUBMERGED ARC WELDING METHOD

TECHNICAL FIELD

This disclosure relates to multi-electrode submerged arc welding for a thick steel plate and a multi-electrode submerged arc welding suitable for, not only flat thick steel plates, but also seam welding for a large-diameter steel pipe such as a UOE steel pipe or a spiral steel pipe produced by forming a thick steel plate into a tubular shape.

BACKGROUND

In butt welding of flat thick steel plates or seam welding for a large-diameter steel pipe such as a UOE steel pipe or a spiral steel pipe in which edges of a thick steel plate having been formed into an open pipe are brought into contact with each other, submerged arc welding is commonly performed in which welding is performed with two or more electrodes disposed in line in the welding advance direction (hereinafter referred to as multi-electrode submerged arc welding). In addition, to increase the productivity of a large-diameter steel pipe, a technique to increase the welding speed by supplying a large current exceeding 1000 A as a welding current by using three or four electrodes has been put into practice.

Furthermore, a technique to further increase the welding speed by further increasing the number of electrodes is under study. For example, Japanese Patent No. 4828488 and Japanese Unexamined Patent Application Publication No. 2014-73523 disclose a technique that performs submerged arc welding by using five electrodes, and Japanese Unexamined Patent Application Publication No. 5-50235 discloses a technique that performs submerged arc welding by using six electrodes.

On the other hand, in seam welding of a large-diameter steel pipe, there is a problem that the toughness of a weld zone, particularly a heat affected zone, is degraded. Thus, the welding heat input needs to be reduced to increase the toughness of the weld zone. However, a reduced welding heat input increases the risk of insufficient penetration or an insufficient amount of deposit metal. Thus, an unmelted part is likely to be generated, which induces a problem of generation of a welding defect in beads (e.g., underfill).

In addition, in multi-electrode submerged arc welding, welding currents supplied to respective welding wires of a large number of electrodes generate magnetic fields. The magnetic fields interfere with each other, resulting in generation of a phenomenon in which arcs become unstable (so-called "magnetic arc blow"). Such magnetic interference causes generation of welding defects such as bead irregularity and slug inclusion. Accordingly, a technique of suppressing the magnetic interference by controlling the supply of alternating currents as welding currents to respective electrodes is under study.

However, in multi-electrode submerged arc welding, the electrodes are disposed close to each other to not separate molten metals formed by the electrodes. Thus, particularly in large-current welding, it is inevitable to increase the interference of magnetic fields of electrodes adjacent to each other even if the welding current to be supplied to the electrodes is adjusted. Moreover, by increasing the number of electrodes, magnetic fields of the plurality of electrodes, in addition to the magnetic fields of the electrodes adjacent to each other, interfere with each other in a complex manner. In addition, it has been difficult to control the shape of penetration of a weld metal in multi-electrode submerged arc welding using five or more electrodes. In particular, the penetration width may have been narrowed near the center of penetration. Such a penetration shape possibly causes pear-shaped cracking of a weld metal and therefore is desirably avoided.

In a multi-electrode submerged arc welding using three or four electrodes, to obtain welding conditions under which complex magnetic interference can be suppressed, various studies have been made.

However, in multi-electrode submerged arc welding using five or six electrodes, the magnetic interference is more complex. Accordingly, welding techniques to suppress magnetic interference have not been developed.

It could therefore be helpful to provide a multi-electrode submerged arc welding method using five or six electrodes to enable deep penetration and a large amount of deposit metal to be obtained by supplying a large current, and to enable stable arcs to be generated by the respective electrodes by suppressing magnetic interference, to thereby prevent welding defects, obtain beads with a good shape, and furthermore, increase the welding speed.

SUMMARY

We conducted multi-electrode submerged arc welding of a thick steel plate by using five or six electrodes to examine the shape of obtained beads and to determine whether a welding defect has been generated. We found that by appropriately adjusting the disposition of the electrodes and the welding currents to be supplied, and preferably by appropriately adjusting arc voltages to be applied, the arcs become stable to prevent a welding defect and obtain beads with a good shape.

We thus provide:

A multi-electrode submerged arc welding method of butt welding of a thick steel plate with a thickness of 15 to 45 mm by using multiple electrodes, including: disposing, in a welding advance direction, a first electrode at a front, a second electrode behind and adjacent to the first electrode, a third electrode behind and adjacent to the second electrode, a fourth electrode behind and adjacent to the third electrode, and a fifth electrode behind and adjacent to the fourth electrode. A distance $L_{12}$ (mm), a distance $L_{23}$ (mm), a distance $L_{34}$ (mm), and a distance $L_{45}$ (mm) satisfy Formulae (1) to (4), the distance $L_{12}$ being a distance between a position where a welding wire of the first electrode is in contact with a surface of the thick steel plate and a position where a welding wire of the second electrode is in contact with the surface of the thick steel plate, the distance $L_{23}$ being a distance between the position where the welding wire of the second electrode is in contact with the surface of the thick steel plate and a position where a welding wire of the third electrode is in contact with the surface of the thick steel plate, the distance $L_{34}$ being a distance between the position where the welding wire of the third electrode is in contact with the surface of the thick steel plate and a position where a welding wire of the fourth electrode is in contact with the surface of the thick steel plate, and the distance $L_{45}$ being a distance between the position where the welding wire of the fourth electrode is in contact with the surface of the thick steel plate and a position where a welding wire of the fifth electrode is in contact with the surface of the thick steel plate. A current density $J_1$ (A/mm$^2$) of the first electrode, a current density $J_2$ (A/mm$^2$) of the second electrode, a current density $J_3$ (A/mm$^2$) of the third electrode, a current density $J_4$ (A/mm$^2$) of the fourth electrode, and a current density $J_5$ (A/mm$^2$) of the fifth electrode satisfy Formulae (6) to (9); and a total welding current of the first to fifth electrodes is 4000 to 6000 A. The welding wire of the first electrode is provided perpendicular or tilted at a backsweep angle with respect to the thick steel plate; and alternating currents are supplied as welding currents to the second to fifth electrodes.

$$12 \text{ mm} \leq L_{12} \leq 25 \text{ mm} \quad (1)$$

$$12 \text{ mm} \leq L_{23} \leq 25 \text{ mm} \quad (2)$$

$$12 \text{ mm} \leq L_{34} \leq 25 \text{ mm} \quad (3)$$

$$12 \text{ mm} \leq L_{45} \leq 25 \text{ mm} \quad (4)$$

$$0.40 \leq J_2/J_1 \leq 0.95 \quad (6)$$

$$0.60 \leq J_3/J_2 \leq 0.95 \quad (7)$$

$$0.60 \leq J_4/J_3 \leq 1.00 \quad (8)$$

$$0.60 \leq J_5/J_4 \leq 1.00 \quad (9)$$

In the multi-electrode submerged arc welding method, it is also possible to dispose, in addition to the first to fifth electrodes, a sixth electrode in the welding advance direction behind and adjacent to the fifth electrode. A distance $L_{56}$ (mm) between the position where the welding wire of the fifth electrode is in contact with the surface of the thick steel plate and a position where a welding wire of the sixth electrode is in contact with the surface of the thick steel plate preferably satisfies Formula (5). A current density $J_6$ (A/mm$^2$) of the sixth electrode preferably satisfies Formula (10), a total welding current of the first to sixth electrodes is preferably 4000 to 6000 A, and an alternating current is preferably supplied as welding current to the sixth electrode. In addition, a direct current is preferably supplied to the first electrode in a reverse polarity. Furthermore, an arc voltage $E_1$ (V) of the first electrode and an arc voltage $E_2$ (V) of the second electrode preferably satisfy Formula (12).

$$12 \text{ mm} \leq L_{56} \leq 25 \text{ mm} \quad (5)$$

$$0.60 \leq J_6/J_5 \leq 1.00 \quad (10)$$

$$0 \leq E_2 - E_1 \leq 3 \quad (12)$$

In multi-electrode submerged arc welding using five or six electrodes, it is possible to obtain deep penetration and a large amount of deposit metal by supplying a large current, and to generate stable arcs from the respective electrodes by suppressing a magnetic interference. Thus, welding defects can be prevented, and beads with a good shape can be obtained. Furthermore, the welding speed can be increased. Thus, special industrial effects are produced.

REFERENCE SIGNS LIST 1 thick steel plate
2 electrode tip
3 welding wire
4 weld metal

DETAILED DESCRIPTION

A multi-electrode submerged arc welding method is a technique for performing submerged arc welding with five or six electrodes disposed in line in the welding advance direction. When using five electrodes, an electrode disposed at the front in the welding advance direction is a first electrode; electrodes disposed behind are sequentially a second electrode, a third electrode, and a fourth electrode; and an electrode at the end is a fifth electrode. When using six electrodes, another electrode is disposed behind the fifth electrode, and this electrode at the end is a sixth electrode.

In the above manner, it is possible to obtain a faster welding speed than that in the conventional art by increasing the number of electrodes used.

The total welding current to be supplied to the electrodes is higher than or equal to 4000 A to prevent insufficient penetration and an insufficient amount of deposit metal accompanying with an increase in the welding speed. In addition, the total welding current to be supplied to the electrodes is lower than or equal to 6000 A to prevent the shape of beads from being degraded as a result of supplying an excessive welding current. That is, when using five electrodes, the total welding current to be supplied to the first to fifth electrodes is 4000 to 6000 A; and when using six electrodes, the total welding current to be supplied to the first to sixth electrodes is 4000 to 6000 A.

Although the five or six electrodes are disposed in line, if the interval between adjacent electrodes (interval between electrodes disposed adjacent to each other) is too small, the electrodes, particularly contact chips come in contact with each other, which lead to arc disturbance. Accordingly, various problems including generation of a welding defect and degradation of shape of beads are generated. On the other hand, if the interval between adjacent electrodes is too large, molten metal to be formed by the electrodes is separated, and welding becomes unstable.

Accordingly, the first to sixth electrodes are disposed such that a distance $L_{12}$ (mm), a distance $L_{23}$ (mm), a distance $L_{34}$ (mm), a distance $L_{45}$ (mm), and a distance $L_{56}$ (mm) satisfy Formulae (1) to (5), the distance $L_{12}$ being a distance between a position where a welding wire of the first electrode is in contact with a surface of a thick steel plate and a position where a welding wire of the second electrode is in contact with the surface of the thick steel plate, the distance $L_{23}$ being a distance between the position where the welding wire of the second electrode is in contact with the surface of the thick steel plate and a position where a welding wire of the third electrode is in contact with the surface of the thick steel plate, the distance $L_{34}$ being a distance between the position where the welding wire of the third electrode is in contact with the surface of the thick steel plate and a position where a welding wire of the fourth electrode is in contact with the surface of the thick steel plate, the distance $L_{45}$ being a distance between the position where the welding wire of the fourth electrode is in contact with the surface of the thick steel plate and a position where a welding wire of the fifth electrode is in contact with the surface of the thick steel plate, and the distance $L_{56}$ being a distance between the position where the welding wire of the fifth electrode is in contact with the surface of the thick steel plate and a position where a welding wire of the sixth electrode is in contact with the surface of the thick steel plate.

$$12 \text{ mm} \leq L_{12} \leq 25 \text{ mm} \tag{1}$$

$$12 \text{ mm} \leq L_{23} \leq 25 \text{ mm} \tag{2}$$

$$12 \text{ mm} \leq L_{34} \leq 25 \text{ mm} \tag{3}$$

$$12 \text{ mm} \leq L_{45} \leq 25 \text{ mm} \tag{4}$$

$$12 \text{ mm} \leq L_{56} \leq 25 \text{ mm} \tag{5}$$

That is, when using five electrodes, the electrodes are disposed to satisfy Formulae (1) to (4); and when using six electrodes, the electrodes are disposed to satisfy Formulae (1) to (5).

The current densities of the welding currents to be supplied to the electrodes affect the arc pressures. Accordingly, to maintain the arc pressures to suitable values, current density ratios between adjacent electrodes are maintained to appropriate values. Specifically, the welding currents are supplied such that a current density $J_1$ (A/mm$^2$) of the first electrode, a current density $J_2$ (A/mm$^2$) of the second electrode, a current density $J_3$ (A/mm$^2$) of the third electrode, a current density $J_4$ (A/mm$^2$) of the fourth electrode, a current density $J_5$ (A/mm$^2$) of the fifth electrode, and a current density $J_6$ (A/mm$^2$) of the sixth electrode satisfy Formulae (6) to (10).

$$0.40 \leq J_2/J_1 \leq 0.95 \tag{6}$$

$$0.60 \leq J_3/J_2 \leq 0.95 \tag{7}$$

$$0.60 \leq J_4/J_3 \leq 1.00 \tag{8}$$

$$0.60 \leq J_5/J_4 \leq 1.00 \tag{9}$$

$$0.60 \leq J_6/J_5 \leq 1.00 \tag{10}$$

That is, when using five electrodes, the welding currents are supplied to satisfy Formulae (6) to (9); and when using six electrodes, the welding currents are supplied to satisfy Formulae (6) to (10). Accordingly, the arc pressures can be maintained at suitable values and, as a result, it is possible to prevent a welding defect and form beads with a good shape. A current density $J_n$(A/mm$^2$) of an n-th electrode is a value calculated from Formula (11).

$$J_n = I_n \div [\pi \times (D_n^2 \div 4)] \tag{11}$$

$I_n$: welding current (A) to be supplied to n-th electrode
$D_n$: diameter (mm) of a welding wire of n-th electrode
n: integer from 1 to 6

Although any of direct current and alternating current may be supplied as welding current to the first electrode among the five or six electrodes, from the view point of increasing the depth of penetration, direct current as welding current (direct current) is preferably supplied. In addition, it is preferable to supply the welding current by using the welding wire as a positive (+) electrode and the thick steel plate as a negative (−) electrode (so-called "reverse polarity"). By supplying direct current as welding current in reverse polarity, melting of the thick steel plate is promoted, thereby further increasing the effect of increasing the depth of penetration.

Together with an increase in the depth of penetration by the first electrode, the large welding current strengthens the backward flow of molten metal, and the arc at the second electrode and subsequent ones are likely to be disturbed. However, by supplying the welding current to satisfy Formulae (6) to (10), the arcs can be stabilized.

Furthermore, at the second electrode and subsequent ones, alternating current as welding current is supplied, thereby preventing magnetic interference. Thus, it is possible to prevent a welding defect and form beads with a good shape. In the alternating current, "current" means "effective current", and "voltage" means "effective voltage".

In addition, if the arc voltage of the second electrode is lower than the arc voltage of the first electrode, the arc voltage of the second electrode becomes unstable. However, if the arc voltage of the second electrode is too high, penetration formed by the first electrode and penetration formed by the second electrode and the subsequent electrodes are separated from each other, forming a constriction near the center of penetration. To avoid this phenomenon, an arc voltage $E_1$ (V) of the first electrode and an arc voltage $E_2$ (V) of the second electrode are preferably set to satisfy Formula (12), more preferably, Formula (13).

$$0 \leq E_2 - E_1 \leq 3 \tag{12}$$

$$0 \leq E_2 - E_1 \leq 2 \tag{13}$$

Figures 1A, 1B:
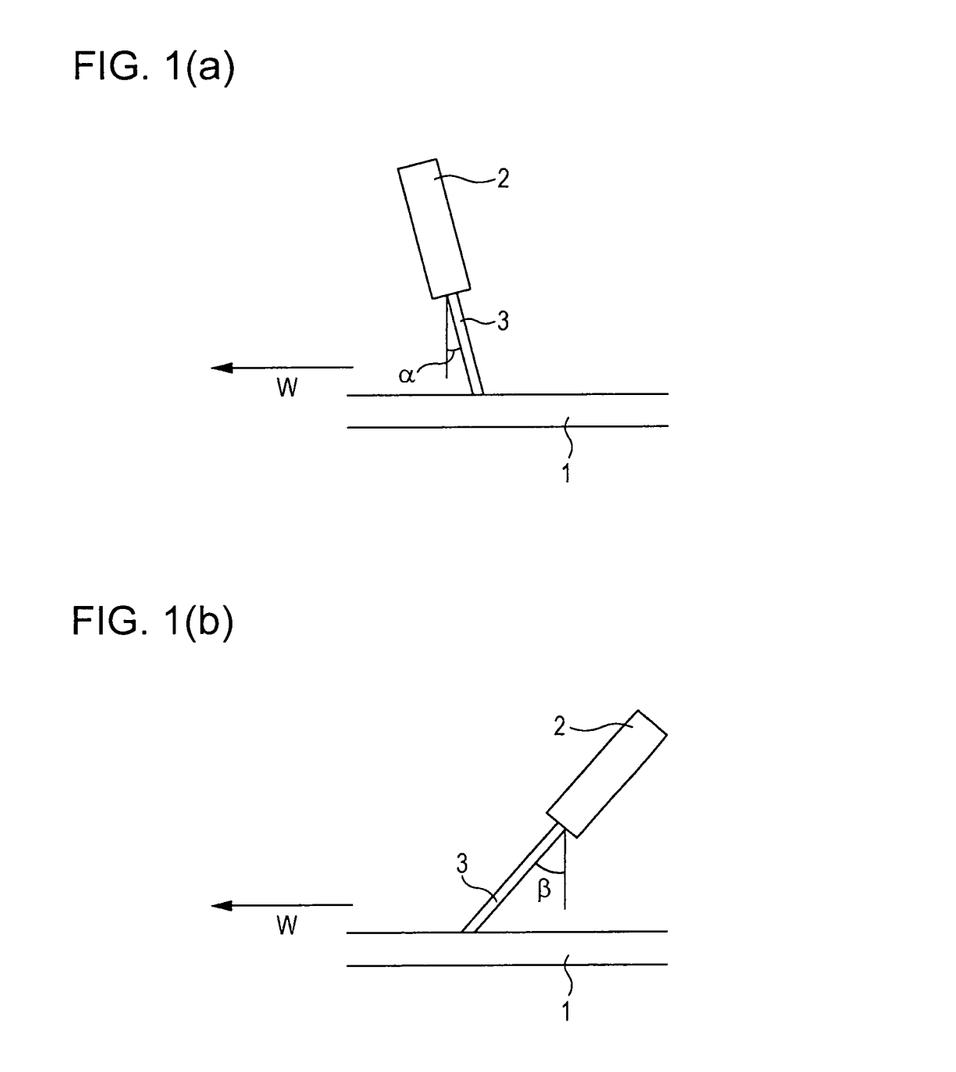
FIGS. 1(a) and 1(b) show a side view schematically illustrating an example in which a welding wire is tilted.

As illustrated in FIGS. 1(a) and 1(b), the welding wire of the first electrode is preferably provided to be perpendicular or tilted at a backsweep angle α with respect to the thick steel plate. This is because deep penetration can be obtained thereby. The backsweep angle α of the first electrode is preferably 0 to 15°.

The welding wires of the second electrode and the subsequent electrodes may be provided perpendicular or tilted with respect to the thick steel plate.

FIG. 1(a) is an example in which a welding wire 3 is tilted so that the end thereof may be located behind an electrode tip 2 in the advance direction, and an angle α formed by a line perpendicular to a thick steel plate 1 and the welding wire 3 is called a backsweep angle. FIG. 1(b) is an example in which the welding wire 3 is tilted so that the end thereof may be located in front of the electrode tip 2 in the advance direction, and an angle β formed by a line perpendicular to the thick steel plate 1 and the welding wire 3 is called an upsweep angle. Each arrow W in FIGS. 1(a) and 1(b) represents the welding advance direction.

Even if a thick steel plate with a thickness of 15 mm or more is used, it is possible to prevent a welding defect and obtain beads with a good shape. In addition, welding can be performed at a high welding speed. However, since the groove width is too large with a thick steel plate with a thickness exceeding 45 mm, molten metal does not spread sufficiently and the groove is likely to remain. Therefore, our methods are applicable to a thick steel plate with a thickness of 15 to 45 mm.

Our methods are highly effective when applied to a thick steel plate with a thickness of 30 mm or more with which how to increase the welding speed is particularly a problem.

The wire diameter (diameter of wire) of the welding wire to be used for each electrode is preferably 3.2 to 4.8 mm. In addition, as a welding flux, any of a fused flux and a agglomerated flux can be used.

Furthermore, our welding method is suitably used for butt welding of a flat thick steel plate in addition to seam welding of a large-dimeter steel pipe such as a UOE pipe or a spiral pipe in which edges of a thick steel plate, having been formed into an open pipe, are brought into contact with each other. In addition, our methods are applicable to grooves of various shapes, and also applicable to one-side welding and both-side welding.

EXAMPLE

One-side Y grooves were formed on thick steel plates with thicknesses of 19.1 mm and 38.1 mm, and multi-electrode submerged arc welding (1 pass) was performed to form welding joints. The thicknesses and groove shapes of the respective thick steel plates are shown in Table 1. Welding conditions are shown in Tables 2, 3, and 4. As for the electrodes, an electrode disposed at the front in the advance direction is a first electrode; electrodes disposed behind are sequentially a second electrode, a third electrode, a fourth electrode, a fifth electrode, and a sixth electrode. Note that types of welding current to be supplied to the first electrode are shown in Table 4, and alternating currents as welding currents were supplied to the electrodes other than the first electrode. Each "welding heat input" in Table 2 was obtained by dividing the total of "welding current× arc voltage" obtained for respective electrodes by "welding speed".

TABLE 1

| No. | Thickness (mm) | Groove Angle (°) | Groove Depth (mm) |
|---|---|---|---|
| 1 | 38.1 | 70 | 15.0 |
| 2 | 38.1 | 70 | 15.0 |
| 3 | 38.1 | 70 | 15.0 |
| 4 | 38.1 | 70 | 13.5 |
| 5 | 38.1 | 70 | 15.0 |
| 6 | 38.1 | 70 | 15.0 |
| 7 | 38.1 | 70 | 15.0 |
| 8 | 38.1 | 70 | 15.0 |
| 9 | 38.1 | 70 | 15.0 |
| 10 | 38.1 | 70 | 15.0 |
| 11 | 38.1 | 70 | 15.0 |
| 12 | 38.1 | 70 | 15.0 |
| 13 | 38.1 | 70 | 15.0 |
| 14 | 38.1 | 70 | 15.0 |
| 15 | 38.1 | 70 | 15.0 |
| 16 | 38.1 | 70 | 15.0 |
| 17 | 19.1 | 90 | 7.0 |
| 18 | 19.1 | 90 | 7.0 |
| 19 | 19.1 | 90 | 7.0 |
| 20 | 19.1 | 90 | 6.0 |
| 21 | 19.1 | 90 | 7.0 |
| 22 | 19.1 | 90 | 7.0 |
| 23 | 19.1 | 90 | 7.0 |
| 24 | 19.1 | 90 | 7.0 |
| 25 | 38.1 | 70 | 15.0 |

TABLE 2

| No. | First Electrode I (A) | First Electrode E (V) | First Electrode D (mm) | Second Electrode I (A) | Second Electrode E (V) | Second Electrode D (mm) | Third Electrode I (A) | Third Electrode E (V) | Third Electrode D (mm) | Fourth Electrode I (A) | Fourth Electrode E (V) | Fourth Electrode D (mm) | Fifth Electrode I (A) | Fifth Electrode E (V) | Fifth Electrode D (mm) | Sixth Electrode I (A) | Sixth Electrode E (V) | Sixth Electrode D (mm) | Welding Speed (mm/min) | Welding Heat Input (kJ/mm) |
|---|---|---|---|---|---|---|---|---|---|---|---|---|---|---|---|---|---|---|---|---|
| 1 | 1350 | 32 | 4.0 | 1100 | 34 | 4.0 | 900 | 38 | 4.0 | 700 | 40 | 4.0 | 500 | 42 | 4.0 | — | — | — | 1200 | 8.19 |
| 2 | 1350 | 32 | 4.0 | 1100 | 34 | 4.0 | 900 | 38 | 4.0 | 700 | 40 | 4.0 | 500 | 42 | 4.0 | — | — | — | 1200 | 8.19 |
| 3 | 1350 | 32 | 4.0 | 1100 | 34 | 4.0 | 900 | 38 | 4.0 | 700 | 40 | 4.0 | — | — | — | — | — | — | 1200 | 7.14 |
| 4 | 1350 | 32 | 4.0 | 1100 | 34 | 4.0 | 900 | 38 | 4.0 | 700 | 40 | 4.0 | — | — | — | — | — | — | 1200 | 7.14 |
| 5 | 1350 | 32 | 4.0 | 1280 | 34 | 4.0 | 1210 | 38 | 4.0 | 730 | 40 | 4.0 | 500 | 42 | 4.0 | — | — | — | 1200 | 9.15 |
| 6 | 1350 | 32 | 3.2 | 850 | 34 | 4.0 | 750 | 38 | 4.8 | 700 | 40 | 4.8 | 650 | 42 | 4.8 | — | — | — | 1200 | 7.80 |
| 7 | 1350 | 32 | 4.0 | 1290 | 34 | 4.0 | 900 | 38 | 4.0 | 700 | 40 | 4.0 | 500 | 42 | 4.0 | — | — | — | 1200 | 8.51 |
| 8 | 1350 | 32 | 3.2 | 800 | 34 | 4.0 | 750 | 38 | 4.0 | 700 | 40 | 4.0 | 650 | 42 | 4.0 | — | — | — | 1200 | 7.71 |
| 9 | 1350 | 32 | 4.0 | 1100 | 34 | 4.0 | 1060 | 38 | 4.0 | 700 | 40 | 4.0 | 500 | 42 | 4.0 | — | — | — | 1200 | 8.49 |
| 10 | 1350 | 32 | 4.0 | 1100 | 34 | 4.0 | 940 | 38 | 4.8 | 700 | 40 | 4.8 | 500 | 42 | 4.8 | — | — | — | 1200 | 8.27 |
| 11 | 1450 | 32 | 4.0 | 1200 | 34 | 4.0 | 1000 | 38 | 4.0 | 850 | 40 | 4.0 | 770 | 42 | 4.0 | 720 | 42 | 4.0 | 1450 | 9.18 |
| 12 | 1450 | 32 | 4.0 | 1200 | 34 | 4.0 | 1000 | 38 | 4.0 | 880 | 40 | 4.0 | 800 | 42 | 4.0 | 750 | 42 | 4.0 | 1450 | 9.33 |
| 13 | 1350 | 32 | 4.0 | 1100 | 34 | 4.0 | 900 | 38 | 4.0 | 700 | 40 | 4.0 | 500 | 42 | 4.0 | — | — | — | 1200 | 8.19 |
| 14 | 1350 | 32 | 4.0 | 1100 | 34 | 4.0 | 900 | 38 | 4.0 | 700 | 40 | 4.0 | 500 | 42 | 4.0 | — | — | — | 1200 | 8.19 |
| 15 | 1350 | 32 | 4.0 | 1100 | 34 | 4.0 | 900 | 38 | 4.0 | 700 | 40 | 4.0 | 500 | 42 | 4.0 | — | — | — | 1200 | 8.19 |
| 16 | 1250 | 35 | 3.2 | 1000 | 37 | 3.2 | 950 | 38 | 4.0 | 760 | 39 | 4.0 | 640 | 40 | 4.0 | — | — | — | 1200 | 8.60 |
| 17 | 1400 | 34 | 4.0 | 1150 | 36 | 4.0 | 950 | 37 | 4.0 | 750 | 38 | 4.0 | 550 | 39 | 4.0 | — | — | — | 2300 | 4.54 |
| 18 | 1280 | 33 | 3.2 | 1150 | 37 | 4.0 | 850 | 40 | 4.0 | 700 | 42 | 4.0 | 550 | 44 | 4.0 | — | — | — | 2300 | 4.50 |
| 19 | 1400 | 34 | 4.0 | 1340 | 36 | 4.0 | 950 | 37 | 4.0 | 750 | 38 | 4.0 | 550 | 39 | 4.0 | — | — | — | 2300 | 4.72 |
| 20 | 1400 | 34 | 4.0 | 1150 | 36 | 4.0 | 950 | 37 | 4.0 | 750 | 38 | 4.0 | — | — | — | — | — | — | 2300 | 3.98 |
| 21 | 1250 | 34 | 4.0 | 950 | 36 | 4.0 | 750 | 38 | 4.0 | 550 | 40 | 4.0 | 550 | 42 | 4.0 | — | — | — | 2300 | 3.87 |
| 22 | 1200 | 34 | 4.0 | 900 | 36 | 4.0 | 750 | 38 | 4.0 | 550 | 40 | 4.0 | 560 | 42 | 4.0 | — | — | — | 2300 | 3.84 |
| 23 | 1350 | 32 | 4.0 | 1100 | 34 | 4.0 | 900 | 38 | 4.0 | 700 | 40 | 4.0 | 500 | 42 | 4.0 | — | — | — | 2300 | 4.27 |
| 24 | 1350 | 33 | 4.0 | 1250 | 36 | 4.0 | 1000 | 39 | 4.0 | 900 | 41 | 4.8 | 600 | 43 | 4.8 | — | — | — | 2300 | 4.99 |
| 25 | 1350 | 32 | 4.0 | 1100 | 36 | 4.0 | 900 | 38 | 4.0 | 700 | 40 | 4.0 | 500 | 42 | 4.0 | — | — | — | 1200 | 8.30 |

I Welding current
E Arc voltage
D Wire diameter

TABLE 3

| No. | Electrode Angle (°) *1 | | | | | | Distance between Thick Steel Plate and Electrode Tip (mm) | | | | | | Distance between Positions where Welding Wire are in Contact with Surface of Thick Steel Plate (mm) | | | | |
|---|---|---|---|---|---|---|---|---|---|---|---|---|---|---|---|---|---|
| | First Electrode | Second Electrode | Third Electrode | Fourth Electrode | Fifth Electrode | Sixth Electrode | First Electrode | Second Electrode | Third Electrode | Fourth Electrode | Fifth Electrode | Sixth Electrode | $L_{12}$ | $L_{23}$ | $L_{34}$ | $L_{45}$ | $L_{56}$ |
| 1 | −10 | 0 | +12 | +24 | +40 | — | 23 | 25 | 30 | 32 | 32 | — | 20 | 20 | 20 | 20 | — |
| 2 | −10 | 0 | +12 | +24 | +40 | — | 23 | 25 | 30 | 32 | 32 | — | 20 | 20 | 20 | 20 | — |
| 3 | −10 | 0 | +12 | +24 | — | — | 23 | 25 | 30 | 32 | — | — | 20 | 20 | 20 | — | — |
| 4 | −10 | 0 | +12 | +24 | — | — | 23 | 25 | 30 | 32 | — | — | 20 | 20 | 20 | — | — |
| 5 | −10 | 0 | +12 | +24 | +40 | — | 23 | 25 | 30 | 32 | 32 | — | 20 | 20 | 20 | 20 | — |
| 6 | −10 | 0 | +12 | +24 | +40 | — | 23 | 25 | 30 | 32 | 32 | — | 20 | 20 | 20 | 20 | — |
| 7 | −10 | 0 | +12 | +24 | +40 | — | 23 | 25 | 30 | 32 | 32 | — | 20 | 20 | 20 | 20 | — |
| 8 | −10 | 0 | +12 | +24 | +40 | — | 23 | 25 | 30 | 32 | 32 | — | 20 | 20 | 20 | 20 | — |
| 9 | −10 | 0 | +12 | +24 | +40 | — | 23 | 25 | 30 | 32 | 32 | — | 20 | 20 | 20 | 20 | — |
| 10 | −10 | 0 | +12 | +24 | +40 | — | 23 | 25 | 30 | 32 | 32 | — | 20 | 20 | 20 | 20 | — |
| 11 | −12 | −5 | +5 | +15 | +30 | +45 | 23 | 25 | 30 | 32 | 32 | 32 | 22 | 22 | 22 | 22 | 22 |
| 12 | −12 | −5 | +5 | +15 | +30 | +45 | 23 | 25 | 30 | 32 | 32 | 32 | 22 | 22 | 22 | 22 | 22 |
| 13 | −10 | 0 | +12 | +24 | +40 | — | 23 | 25 | 30 | 32 | 32 | — | 25 | 25 | 25 | 25 | — |
| 14 | −10 | 0 | +12 | +24 | +40 | — | 23 | 25 | 30 | 32 | 32 | — | 12 | 12 | 12 | 12 | — |
| 15 | −10 | 0 | +12 | +24 | +40 | — | 23 | 25 | 30 | 32 | 32 | — | 27 | 27 | 27 | 27 | — |
| 16 | 0 | +10 | +20 | +30 | +40 | — | 27 | 30 | 33 | 33 | 33 | — | 18 | 18 | 22 | 22 | — |
| 17 | −12 | −3 | +5 | +16 | +26 | — | 25 | 27 | 32 | 34 | 34 | — | 22 | 22 | 24 | 24 | — |
| 18 | −5 | +5 | +15 | +25 | +35 | — | 27 | 29 | 35 | 35 | 35 | — | 22 | 22 | 18 | 18 | — |
| 19 | −12 | −3 | +5 | +16 | +26 | — | 25 | 27 | 32 | 34 | 34 | — | 22 | 22 | 24 | 24 | — |
| 20 | −12 | −3 | +5 | +16 | — | — | 25 | 27 | 32 | 34 | — | — | 22 | 22 | 24 | — | — |
| 21 | −12 | −3 | +8 | +25 | +45 | — | 32 | 34 | 39 | 41 | 41 | — | 21 | 21 | 23 | 25 | — |
| 22 | −12 | −3 | +8 | +25 | +45 | — | 32 | 34 | 39 | 41 | 41 | — | 21 | 21 | 23 | 25 | — |
| 23 | −12 | −3 | +8 | +25 | +45 | — | 32 | 34 | 39 | 41 | 41 | — | 21 | 21 | 23 | 25 | — |
| 24 | −10 | 0 | +8 | +16 | +25 | — | 27 | 29 | 34 | 36 | 36 | — | 20 | 18 | 15 | 12 | — |
| 25 | −10 | 0 | +12 | +24 | +40 | — | 23 | 25 | 30 | 32 | 32 | — | 20 | 20 | 20 | 20 | — |

*1
+ Upsweep angle
− Backsweep angle
0 Perpendicular

TABLE 4

| | Welding Current | | | | | Current Supplied |
|---|---|---|---|---|---|---|
| No. | Total (A) | $J_2/J_1$ | $J_3/J_2$ | $J_4/J_3$ | $J_5/J_4$ | $J_6/J_5$ | to First Electrode |
| 1 | 4550 | 0.81 | 0.82 | 0.78 | 0.71 | — | AC |
| 2 | 4550 | 0.81 | 0.82 | 0.78 | 0.71 | — | DC |
| 3 | 4050 | 0.81 | 0.82 | 0.78 | — | — | AC |
| 4 | 4050 | 0.81 | 0.82 | 0.78 | — | — | AC |
| 5 | 5070 | 0.95 | 0.95 | 0.60 | 0.68 | — | AC |
| 6 | 4300 | 0.40 | 0.61 | 0.93 | 0.93 | — | AC |
| 7 | 4740 | 0.96 | 0.70 | 0.78 | 0.71 | — | AC |
| 8 | 4250 | 0.38 | 0.94 | 0.93 | 0.93 | — | AC |
| 9 | 4710 | 0.81 | 0.96 | 0.66 | 0.71 | — | AC |
| 10 | 4590 | 0.81 | 0.59 | 0.74 | 0.71 | — | AC |
| 11 | 5990 | 0.83 | 0.83 | 0.85 | 0.91 | 0.94 | AC |
| 12 | 6080 | 0.83 | 0.83 | 0.88 | 0.91 | 0.94 | AC |
| 13 | 4550 | 0.81 | 0.82 | 0.78 | 0.71 | — | AC |
| 14 | 4550 | 0.81 | 0.82 | 0.78 | 0.71 | — | AC |
| 15 | 4550 | 0.81 | 0.82 | 0.78 | 0.71 | — | AC |
| 16 | 4600 | 0.80 | 0.61 | 0.80 | 0.84 | — | DC |
| 17 | 4800 | 0.82 | 0.83 | 0.79 | 0.73 | — | AC |
| 18 | 4530 | 0.58 | 0.74 | 0.82 | 0.79 | — | DC |
| 19 | 4990 | 0.96 | 0.71 | 0.79 | 0.73 | — | DC |
| 20 | 4250 | 0.82 | 0.83 | 0.79 | — | — | DC |
| 21 | 4000 | 0.76 | 0.79 | 0.73 | 0.91 | — | DC |
| 22 | 3960 | 0.75 | 0.83 | 0.73 | 1.02 | — | DC |
| 23 | 4550 | 0.81 | 0.82 | 0.78 | 0.71 | — | AC |
| 24 | 5100 | 0.93 | 0.80 | 0.63 | 0.67 | — | DC |
| 25 | 4550 | 0.81 | 0.82 | 0.78 | 0.71 | — | AC |

A steady region of each of the obtained welding joints was visually observed to determine whether there was a welding defect. In addition, the bead width was measured in a length of 1000 mm of the steady region of the welding joint, and a difference between a maximum and a minimum was obtained.

Figure 2:
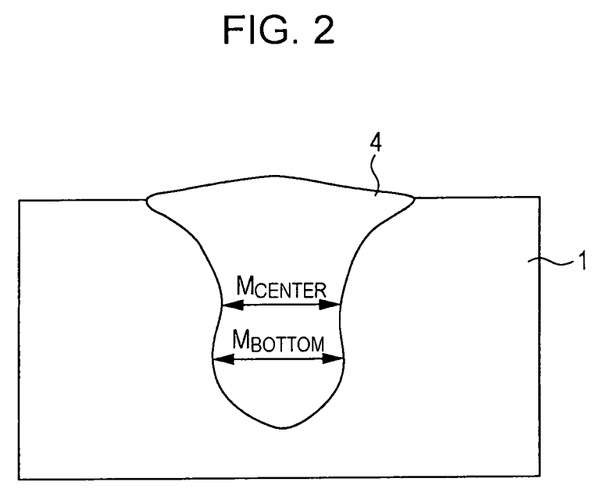
FIG. 2 is a cross-sectional view of a weld zone schematically illustrating an example of a penetration constriction.

Next, three cross-sectional macroscopic observation samples were taken from the steady region of each of the welding joints. Then, a distance from the surface of the thick steel plate to the end of the penetration was measured, and an average of the values at the three cross sections was evaluated as the penetration depth. Similarly, the cross-sectional macroscopic observation samples were observed to determine whether there was a penetration constriction. The penetration constriction here means, as illustrated in FIG. 2, a penetration width $M_{CENTER}$ near the center of penetration being smaller than a penetration width $M_{BOTTOM}$ on the side of penetration end.

The results are shown in Table 5. In Table 5, *3 represents a welding joint for which the difference between the maximum bead width and the minimum bead width exceeds 2.5 mm, from which it is found that welding was unstable. In addition, *2 in Table 5 represents a welding joint for which penetration was shallow, which is, the penetration depth being less than 0.65 times as deep as the thickness of the plate.

TABLE 5

| No. | Welding Defect and Bead Appearance | Difference between Maximum Bead Width and Minimum Bead Width (mm) | Penetration Depth (mm) | Note |
|---|---|---|---|---|
| 1 | No Abnormality | 1.1 | 26.2 | Example |
| 2 | No Abnormality | 1.8 | 27.6 | Example |
| 3 | Underfill | 4.6 *3 | 26.3 | Comparative Example |

TABLE 5-continued

| No. | Welding Defect and Bead Appearance | Difference between Maximum Bead Width and Minimum Bead Width (mm) | Penetration Depth (mm) | Note |
|---|---|---|---|---|
| 4 | No Abnormality | 1.9 | 24.6 *2 | Comparative Example |
| 5 | No Abnormality | 2.2 | 26.8 | Example |
| 6 | No Abnormality | 1.9 | 28.7 | Example |
| 7 | No Abnormality | 2.6 *3 | 27.1 | Comparative Example |
| 8 | No Abnormality | 3.2 *3 | 28.2 | Comparative Example |
| 9 | No Abnormality | 3.4 *3 | 26.0 | Comparative Example |
| 10 | No Abnormality | 3.6 *3 | 25.9 | Comparative Example |
| 11 | No Abnormality | 2.2 | 25.7 | Example |
| 12 | High Excess Weld Metal Height | 3.0 *3 | 26.0 | Comparative Example |
| 13 | No Abnormality | 2.3 | 26.6 | Example |
| 14 | No Abnormality | 1.7 | 27.4 | Example |
| 15 | No Abnormality | 2.9 *3 | 25.6 | Comparative Example |
| 16 | No Abnormality | 2.4 | 28.0 | Example |
| 17 | No Abnormality | 2.0 | 13.8 | Example |
| 18 | No Abnormality | 2.3 | 15.1 | Example |
| 19 | High Excess Weld Metal Height | 4.7 *3 | 14.2 | Comparative Example |
| 20 | No Abnormality | 1.7 | 12.3 *2 | Comparative Example |
| 21 | No Abnormality | 1.4 | 14.6 | Example |
| 22 | No Abnormality | 2.9 *3 | 12.2 *2 | Comparative Example |
| 23 | No Abnormality | 2.1 | 13.6 | Example |
| 24 | No Abnormality | 2.2 | 13.6 | Example |
| 25 | No Abnormality | 1.9 | 26.0 | Example |

*2: Penetration depth is less than 0.65 times as deep as thickness of plate
*3: Difference between maximum bead width and minimum bead width exceeds 2.5 mm Table 5 shows that in each of the Examples to which our method was applied (Nos. 1, 2, 5, 6, 11, 13, 14, 16, 17, 18, 21, 23, 24, and 25), deep penetration and high deposition rate were obtained, thereby obtaining beads with a good shape or appearance while preventing a welding defect at a high welding speed of 1200 mm/minute or higher.

In each of the Examples other than Nos. 18 and 25, the arc voltage $E_1$ (V) of the first electrode and the arc voltage $E_2$ (V) of the second electrode satisfy Formula (12) and, accordingly, a penetration constriction was not formed.

In each of Examples of Nos. 6 and 16, a welding joint of a thick steel plate with a thickness of 38.1 mm was formed by using a small-diameter (3.2 mm) welding wire for the first electrode. In Example of No. 18, a welding joint of a thick steel plate with a thickness of 19.1 mm was formed by using a small-diameter (3.2 mm) welding wire for the first electrode. In these Examples, the current density was increased by using a small-diameter welding wire and, as a result, deeper penetration than in the other Examples using a plate with the same thickness was obtained.

Nos. 2 and 16 are examples in each of which direct current as welding current was supplied to the first electrode to form a welding joint of a thick steel plate with a thickness of 38.1 mm, and Nos. 18, 21, and 24 are examples in each of which direct current as welding current was supplied to the first electrode to form a welding joint of a thick steel plate with a thickness of 19.1 mm. In these Examples, by supplying the direct-current welding current to the first electrode, penetration was deeper than that in the other Examples using a plate with the same thickness.

On the other hand, in each of Comparative Examples of Nos. 3, 4, and 20, a welding joint was formed by using four electrodes. Thus, welding was performed at the same welding speed as that in the Examples, which resulted in underfill and insufficient penetration.

In each of Nos. 7, 8, 9, 10, and 19, the current densities of the welding currents did not satisfy Formulae (6) to (10) and, thus, the arc was disturbed, and the bead width largely varied.

In No. 12, the total welding current exceeded 6000 A and, thus, the bead width largely varied.

In No. 22, the total welding current was less than 4000 A, which resulted in insufficient penetration. In addition, the current densities did not satisfy Formula (9) and, thus, the bead width largely varied.

The invention claimed is:
1. A multi-electrode submerged arc welding method of butt welding of a thick steel plate by using multiple electrodes, wherein a thickness of the thick steel plate is 15 to 45 mm and the multiple electrodes consists of five electrodes, the method comprising:
disposing, in a welding advance direction, a first electrode at a selected position, a second electrode behind and adjacent to the first electrode, a third electrode behind and adjacent to the second electrode, a fourth electrode behind and adjacent to the third electrode, and a fifth electrode behind and adjacent to the fourth electrode; and
supplying first to fifth welding currents to the first to fifth electrodes such that a current density $J_1$ (A/mm$^2$) of the first electrode, a current density $J_2$ (A/mm$^2$) of the second electrode, a current density $J_3$ (A/mm$^2$) of the third electrode, a current density $J_4$ (A/mm$^2$) of the fourth electrode, a current density $J_5$ (A/mm$^2$) of the fifth electrode satisfy Formulae (6) to (9), an arc voltage of the first electrode $E_1$ (V) and an arc voltage of the second electrode $E_2$ (V) satisfy Formula (13), and a difference between a maximum bead width and a minimum bead width in an obtained welding joint is 2.5 mm or less in a length of 1000 mm of a steady region of the obtained welding joint, wherein:
a distance $L_{12}$ (mm), a distance $L_{23}$ (mm), a distance $L_{34}$ (mm), and a distance $L_{45}$ (mm) satisfy Formulae (1) to (4), the distance $L_{12}$ being a distance between a position where a welding wire of the first electrode is in contact with a surface of the thick steel plate and a position where a welding wire of the second electrode is in contact with the surface of the thick steel plate, the distance $L_{23}$ being a distance between the position where the welding wire of the second electrode is in contact with the surface of the thick steel plate and a position where a welding wire of the third electrode is in contact with the surface of the thick steel plate, the distance $L_{34}$ being a distance between the position where the welding wire of the third electrode is in contact with the surface of the thick steel plate and a position where a welding wire of the fourth electrode is in contact with the surface of the thick steel plate, and the distance $L_{45}$ being a distance between the position where the welding wire of the fourth electrode is in contact with the surface of the thick steel plate and a position where a welding wire of the fifth electrode is in contact with the surface of the thick steel plate;
a total welding current of the five electrodes is 4000 to 6000 A;

the welding wire of the first electrode is provided perpendicular or tilted at a backsweep angle with respect to the thick steel plate; and alternating currents are supplied as welding currents to the second to fifth electrodes, $$12 \text{ mm} \leq L_{12} \leq 25 \text{ mm} \tag{1}$$

$$12 \text{ mm} \leq L_{23} \leq 25 \text{ mm} \tag{2}$$

$$12 \text{ mm} \leq L_{34} \leq 25 \text{ mm} \tag{3}$$

$$12 \text{ mm} \leq L_{45} \leq 25 \text{ mm} \tag{4}$$

$$0.40 \leq J_2/J_1 \leq 0.95 \tag{6}$$

$$0.60 \leq J_3/J_2 \leq 0.95 \tag{7}$$

$$0.60 \leq J_4/J_3 \leq 1.00 \tag{8}$$

$$0.60 \leq J_5/J_4 \leq 1.00 \tag{9}$$

$$0 \leq E_2 - E_1 \leq 2 \tag{13}.$$

2. A multi-electrode submerged arc welding method of butt welding of a thick steel plate by using multiple electrodes, wherein a thickness of the thick steel plate is 15 to 45 mm and the multiple electrodes consists of six electrodes, the method comprising:

disposing, in a welding advance direction, a first electrode at a front, a second electrode behind and adjacent to the first electrode, a third electrode behind and adjacent to the second electrode, a fourth electrode behind and adjacent to the third electrode, a fifth electrode behind and adjacent to the fourth electrode, and a sixth electrode behind and adjacent to the fifth electrode; and supplying a first to sixth welding currents to the first to sixth electrodes such that a current density $J_1$ (A/mm$^2$) of the first electrode, a current density $J_2$ (A/mm$^2$) of the second electrode, a current density $J_3$ (A/mm$^2$) of the third electrode, a current density $J_4$ (A/mm$^2$) of the fourth electrode, a current density $J_5$ (A/mm$^2$) of the fifth electrode, and a current density $J_6$ (A/mm$^2$) of the sixth electrode satisfy Formulas (6) to (10), an arc voltage of the first electrode $E_1$ (V) and an arc voltage of the second electrode $E_2$ (V) satisfy the following Formula (13), and a difference between a maximum bead width and a minimum bead width in an obtained welding joint is 2.5 mm or less in a length of 1000 mm of a steady region of the obtained welding joint, wherein:

a distance $L_{12}$ (mm), a distance $L_{23}$ (mm), a distance $L_{34}$ (mm), a distance $L_{45}$ (mm), and a distance $L_{56}$ (mm) satisfy Formulas (1) to (5), the distance $L_{12}$ being a distance between a position where a welding wire of the first electrode is in contact with a surface of the thick steel plate and a position where a welding wire of the second electrode is in contact with the surface of the thick steel plate, the distance $L_{23}$ being a distance between the position where the welding wire of the second electrode is in contact with the surface of the thick steel plate and a position where a welding wire of the third electrode is in contact with the surface of the thick steel plate, the distance $L_{34}$ being a distance between the position where the welding wire of the third electrode is in contact with the surface of the thick steel plate and a position where a welding wire of the fourth electrode is in contact with the surface of the thick steel plate, the distance $L_{45}$ being a distance between the position where the welding wire of the fourth electrode is in contact with the surface of the thick steel plate and a position where a welding wire of the fifth electrode is in contact with the surface of the thick steel plate, and the distance $L_{56}$ (mm) being a distance between the position where the welding wire of the fifth electrode is in contact with the surface of the thick steel plate and a position where a welding wire of the sixth electrode is in contact with the surface of the thick steel plate;

a total welding current of the six electrodes is 4000 to 6000 A;

the welding wire of the first electrode is provided perpendicular or tilted at a backsweep angle with respect to the thick steel plate; and an alternating current is supplied as a welding current to the second to sixth electrodes, $$12 \text{ mm} \leq L_{12} \leq 25 \text{ mm} \tag{1}$$

$$12 \text{ mm} \leq L_{23} \leq 25 \text{ mm} \tag{2}$$

$$12 \text{ mm} \leq L_{34} \leq 25 \text{ mm} \tag{3}$$

$$12 \text{ mm} \leq L_{45} \leq 25 \text{ mm} \tag{4}$$

$$12 \text{ mm} \leq L_{56} \leq 25 \text{ mm} \tag{5}$$

$$0.40 \leq J_2/J_1 \leq 0.95 \tag{6}$$

$$0.60 \leq J_3/J_2 \leq 0.95 \tag{7}$$

$$0.60 \leq J_4/J_3 \leq 1.00 \tag{8}$$

$$0.60 \leq J_5/J_4 \leq 1.00 \tag{9}$$

$$0.60 \leq J_6/J_5 \leq 1.00 \tag{10}$$

$$0 \leq E_2 - E_1 \leq 2 \tag{13}.$$

3. The method according to claim 1, wherein a direct current is supplied to the first electrode in a reverse polarity.

4. The method according to claim 2, wherein a direct current is supplied to the first electrode in a reverse polarity.

* * * * *